Patented May 17, 1949

2,470,324

UNITED STATES PATENT OFFICE 2,470,324

GLYCIDYL ESTER COPOLYMERS

Hanns Peter Staudinger, Ewell, Donald Faulkner, Cambridge, and Maurice Dudley Cooke, Banstead, England, assignors to The Distillers Company Limited, Edinburgh, Scotland, a British company No Drawing. Application December 9, 1944, Serial No. 567,527. In Great Britain December 3, 1943

Section 1, Public Law 690, August 8, 1946
Patent expires December 3, 1963

5 Claims. (Cl. 260—86.3)

This invention concerns the manufacture of new plastic compositions by the polymerisation of halogen-containing-ethenoid compounds with compounds containing the glycidyl radicle and an aliphatic unsaturated group.

In the Staudinger et al. co-pending application Serial No. 473,398, filed January 23, 1943, and now abandoned, it has been stated that polymerisation of halogen - containing - ethenoid monomers in the presence of compounds containing the group

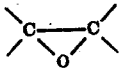

gives polymers of increased heat stability, while in a further co-pending application by Staudinger et al. Serial No. 551,068, filed August 24, 1944, and now abandoned, it has been stated that the heat stability and mouldability of polymerised halogen - containing - ethenoid compounds was improved by carrying out the polymerisation in the presence of compounds, containing the olefine oxide group, derived from polymerisable compounds such as styrene or indene.

An object of this invention is to produce polymerisation products from halogen-containing-ethenoid compounds which are more stable to heat and light and which show improved mechanical properties.

According to the present invention there is provided a process whereby the heat and light stability, mechanical properties and other desirable characteristics, such as solubility in organic solvents, of the halogen-containing-ethenoid polymer can be considerably enhanced which comprises subjecting a halogen-containing-ethenoid compound, or a mixture of such compounds, in admixture with an ester which contains both the glycidyl radicle and an aliphatic unsaturated group within the molecule, to conditions which are known to effect polymerisation, such as the action of heat and/or actinic light and/or a peroxidic catalyst. Examples of the compounds containing glycidyl groups include the glycidyl esters and glycidyl ethers which contain an aliphatic unsaturated group. Typical glycidyl esters include those obtained from glycidol and crotonic acid, maleic acid, acrylic acid, alpha-chlor acrylic acid, methacrylic acid and cinnamic acid. Ether-esters such as the maleic and crotonic esters of ethylene glycol monoglycidyl ether may also be employed.

The term halogen-containing-ethenoid compound refers to polymerisable compounds containing the group

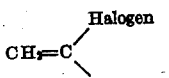

such as vinyl chloride, vinylidene chloride, alpha-chloracrylo-nitrile, alphachloracrylic esters and alphachlorvinyl ethers.

The co-polymerisation may be effected by heating the components together either without addition of solvents or diluents, or with the addition of a solvent or an inert diluent, or dispersed in the form of an emulsion in an aqueous phase. It is preferable in those cases in which the resulting co-polymer is only slightly soluble in the mixture of the monomers, to carry out the polymerisation in the form of a dispersion or emulsion, while, in cases where the co-polymer is soluble in the mixture of the monomers, it is equally advantageous to carry out the polymerisation in the presence of a suitable diluent or in the absence of a diluent. Other polymerisable non-halogenated ethenoid compounds, such as methyl methacrylate and vinyl acetate, may also be added to the reaction mixture to be polymerised therewith.

The reaction may be speeded up by the use of a peroxidic catalyst, such as crotonyl peroxide or benzoyl peroxide, or, when carrying out the polymerisation in emulsion with an aqueous continuous phase, we may use also persalts as a catalyst, such as ammonium persulphate. The temperature at which the co-polymerisation is carried out may vary from 20° C. to about 80° C. according to the nature of the halogen-containing-ethenoid compound. Thus, for example, when using vinyl chloride, we prefer to work at the lower end of this range, while with vinylidene chloride and with chloracrylic acid derivatives, we may carry out the polymerisation at 80° C. or even higher temperatures. The amount of the glycidyl ester added to the halogen-containing-ethenoid compound will depend on the properties desired in the final product. We have found, for example, that with an increase in the amount of the said glycidyl esters, the flow properties of the polymer are improved, with a simultaneous reduction in softening point, so that, from the practical point of view, a large proportion of the said glycidyl ester may not always be desirable. We prefer to use the said glycidyl ester in quantities of from 1% to 50%, based on the weight of the halogen-containing-ethenoid compound, but higher percentages may be used if desired.

The following examples illustrate the manner in which this invention may be carried into effect:

*Example 1.*—Two mixtures were made, each containing 20 gms. freshly distilled vinylidene chloride and 0.03 gm. crotonyl peroxide, together with 30 ccs. of a 1% by weight aqueous solution of sodium lauryl sulphate and 3 ccs. glacial acetic acid; to one of these mixtures was added 4 gms. allyl-glycidyl ether. The polymerisation of the mixtures was carried out in sealed glass tubes immersed in a water bath maintained at 40° C. the tubes being rotated end-over-end. The tubes were taken out of the water bath after 26 hours and the contents isolated by filtering, washing and drying. The polymers were examined and the following results were obtained:

|  | Tube containing no allylglycidyl ether | Tube containing 4 gms. allylglycidyl ether |
|---|---|---|
| Yield_____per cent__ | 100 | 72 |
| Chlorine content_____ | 73.4 | 71.0 |
| Per cent by weight of allylglycidyl ether in polymer_____ | nil | 3.2 |
| Heat stability_____ | 29 | 20 |
| Colour of disc, pressed at 190° C___ | Brown | Light Brown |

(The figure for heat stability was obtained by matching the colour of the moulded discs by reflected light in a "Kodak" colorimeter.)

*Example 2.*—20 gms. of vinylidene chloride mixed with 1 gm. glycidyl methacrylate and 0.02 gm. of crotonyl peroxide were emulsified in a sealed glass tube with 50 ccs. of a 1% by weight aqueous solution of the sodium salts of a mixture of sulphated cetyl and stearyl alcohols. The sealed tube was immersed in a water bath maintained at 40° C. After 8 days the emulsion was broken by the addition of dilute aluminum sulphate solution. The product, after washing and drying, was obtained in a yield of 77%. Analysis of the polymer by the Carius method showed a chlorine content of 69.3% by weight corresponding to a copolymer composition of 94.6% by weight of vinylidene chloride and 5.4% by weight of glycidyl methacrylate. 2 gms. of this polymer were mixed with 0.3 gm. of tricresyl phosphate dissolved in 5 ccs. of ether. The mass was stirred vigorously and the low boiling ether was then evaporated. The dried powder was pressed in a copper mould at 190° C. for thirty seconds to give a disc of approximately $\tfrac{1}{32}$ of an inch in thickness. It was found that the polymer had flowed readily to give a pliable, transparent disc of a very light yellow colour. When pressing polyvinylidene chloride, together with the same amount of tricresyl phosphate, a disc is obtained which is brown, shows signs of insufficient flow and, even where some flow had occurred, is very brittle. When comparing the colour of these discs in a "Kodak" colorimeter, the disc pressed from the copolymer gave a total of 8 colour units, while the polyvinylidene chloride disc gave a total of 26 colour units.

*Example 3.*—2000 gms. of vinylidene chloride, 77 gms. of glycidyl methacrylate and 4.7 gms. of crotonyl peroxide were emulsified in 7 litres of a 1% by weight aqueous solution of the sodium salts of sulphated stearyl and cetyl alcohols by high-speed stirring in a glass-lined pressure vessel. The emulsion was kept at a temperature of 40° C. The glycidyl methacrylate concentration was maintained at the initial concentration of 3.8% by weight by further additions of a solution in vinylidene chloride of glycidyl methacrylate during the polymerisation so as to produce a copolymer with a final composition of 5% by weight of glycidyl methacrylate and 95% by weight of vinylidene chloride. The further additions of a solution of 44 gms. glycidyl methacrylate in 260 ccs. of vinylidene chloride were made as follows:

| | Solution added, cc. |
|---|---|
| 14 hrs. | 65 |
| 26 hrs. | 60 |
| 38 hrs. | 56 |
| 50 hrs. | 44 |
| 62 hrs. | 32 |
| 74 hrs. | 16 |
| 86 hrs. | 12 |

Polymerisation was substantially complete after 100 hours heating, and the emulsion was then coagulated by the addition of aluminum sulphate, the polymer filtered off and thoroughly washed to remove the emulsifying agent.

What we claim is:

1. A process for the production of improved polymers of halogen-containing ethenoid compounds which comprises polymerising in aqueous emulsion a mixture of a halogen-containing ethenoid compound with from 1% to 50% by weight thereof of an unsaturated glycidyl ester containing an unsaturated aliphatic group.

2. A process for the production of an improved vinylidene chloride copolymer which comprises polymerising in aqueous emulsion an emulsified mixture of vinylidene chloride with about 5% by weight thereof of glycidyl methacrylate by the action of a peroxidic catalyst at a temperature of about 40° C.

3. A process for the production of an improved vinylidene chloride copolymer which comprises polymerising in aqueous emulsion an emulsified mixture of vinylidene chloride with about 5% by weight thereof of glycidyl methacrylate by the action of a peroxidic catalyst at a temperature of about 40° C. and maintaining the concentration of the monomeric glycidyl methacrylate in the polymerisation mixture by the addition of a solution thereof in vinylidene chloride of a concentration of 15% to 20% by weight.

4. A new composition of matter comprising a copolymer of a halogen-containing ethenoid compound with from 1% to 50% by weight thereof of an unsaturated glycidyl ester containing an unsaturated aliphatic group.

5. A process for the production of improved polymers of halogen-containing ethenoid compounds which comprises polymerising a mixture of a halogen-containing ethenoid compound with an unsaturated glycidyl ester containing an unsaturated aliphatic group, the said mixture being dispersed in the form of an aqueous emulsion.

HANNS PETER STAUDINGER.
DONALD FAULKNER.
MAURICE DUDLEY COOKE.

REFERENCES CITED

The following references are of record in the file of this patent:

UNITED STATES PATENTS

| Number | Name | Date |
|---|---|---|
| 2,160,939 | Reinhardt | June 6, 1939 |
| 2,160,943 | Britton et al. | June 6, 1939 |
| 2,245,742 | Alexander et al. | June 17, 1941 |

FOREIGN PATENTS

| Number | Country | Date |
|---|---|---|
| 656,133 | Germany | Jan. 29, 1938 |